United States Patent
Williams

[11] 3,805,065
[45] Apr. 16, 1974

[54] LIGHTING CONTROL SYSTEM

[76] Inventor: Albert M. Williams, Box 25262, Los Angeles, Calif. 90025

[22] Filed: Apr. 13, 1973

[21] Appl. No.: 350,851

[52] U.S. Cl.................. 250/226, 250/205, 250/209, 250/227
[51] Int. Cl. ........ G01j 1/32, G01j 3/34, G02b 5/14
[58] Field of Search ............ 250/226, 227, 205, 209

[56] References Cited
UNITED STATES PATENTS

| | | | |
|---|---|---|---|
| 3,431,427 | 3/1969 | Pahl, Jr.............................. | 250/226 |
| 3,244,894 | 4/1966 | Steele et al. ........................ | 250/227 |
| 2,749,501 | 6/1956 | Bartlett............................. | 250/226 X |
| 3,619,059 | 11/1971 | Muller ............................ | 250/226 X |

*Primary Examiner*—James W. Lawrence
*Assistant Examiner*—T. N. Grigsby

[57] ABSTRACT

A lighting control system for varying the intensity of a light source. A plurality of the spectrum wavelength bands from the light source are detected. The intensity of each of the bands is measured and an output signal is generated in accordance with the intensity of each of the measured bands. Control feedback means may be provided for varying the intensity of the light source in accordance with the output signal. The spectral wavelength bands of light may be complementary colors so that the intensity as well as the hue of the light can be varied. A light detector can include a directivity-sensitive end cap, the cap transmitting the detected light through a bundle of optical fibers to a plurality of photoconductive cells, with each of the photoconductive cells being sensitive to light in one of the spectral wavelength bands.

6 Claims, 6 Drawing Figures

PATENTED APR 16 1974 3,805,065

LIGHTING CONTROL SYSTEM

BACKGROUND OF THE INVENTION

1. Field of the Invention

The field of art to which the invention pertains includes the field of lighting control systems, particularly with respect to an optical-electronic control system for detecting and measuring the intensity of a plurality of spectral bands from a source of light.

2. Description of the Prior Art

Conventional lighting control systems which control a light source normally measure the intensity of the light source. Correction of the light intensity may then be provided to the desired level. In studies of people working under various light sources, it has been determined that conventional light sources contain various undesirable hues of light. For example, the spectral nature of light is such that certain light bands provide hues of light which can increase the fatigue of a person working under such a light band. Further, certain types of work, such as reading and writing, can be improved with different hues of light. At present, where it is desired to provide different hues of light, it is necessary to change the light source. For example, in fluorescent lighting, it has been found that certain lamps will provide too blue a hue and that a different type of fluorescent lamp must be utilized. Where people are working with fabrics of varying shades, it has been found that the hue of light can be changed so that the work output can be greatly increased.

Known prior art includes U.S. Pat. Nos. 3,530,341; 3,558,895; and 3,649,118.

In order to overcome the attendant disadvantages of prior art lighting control systems, the present invention provides a system for detecting as well as measuring the spectral wavelength band colors from a given light source. Control signals can be generated to compensate for undesirable hues produced by the light source. The present invention can be used to correct lighting intensity as well as color hue, and thereby increase work output in reading, writing and other fields.

In addition, the present invention can be utilized to minimize the amount of electrical energy needed to operate the light source. In areas where power line variations occur, the present invention enables control circuitry to be provided so that the lighting intensity can be corrected even though power line voltage regulations are occurring. The system can be used to "color-correct" a light source as well as to provide automatic on-off operation of a source of light when needed. Control circuitry includes a damping network for minimizing the effects of sudden changes in the light source.

SUMMARY OF THE INVENTION

A lighting control system for varying the hue and intensity of a light source. The spectral wavelength bands of color from the light source are detected. The intensity of each of the bands is measured and an output signal is generated.

DESCRIPTION OF THE PREFERRED EMBODIMENT

Figure 1:
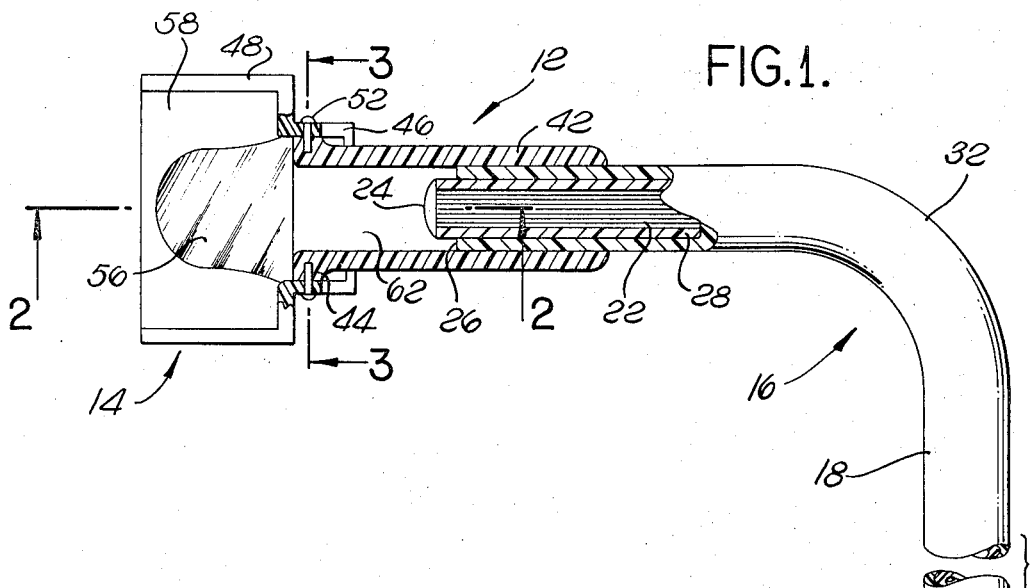
FIG. 1 illustrates a detecting probe, partially in cross-section, and broken away for detecting a light source.

Referring now to the drawings, there is shown in FIG. 1 a novel photo-optical probe 12 constructed in accordance with the principles of the invention. The probe 12 includes an end cap 14. Light rays adjacent the end cap 14 are transmitted through a fiber-optical light-transmission line 16 mounted in a tube 18 of the probe 12 to a detector and measuring circuit (not shown in FIG. 1). The tube 18, which supports the bundle of optical fibers 22, can be made of either rigid or semiflexible material.

The bundle of optical fibers 22 is arranged to receive light at its input end 24 which extends slightly forward from the front end 26 of the tube 18. The fibers are surrounded in the tube by means of a flexible sheath 28 which acts as a protective or support layer. The light-receiving input end 24 of the optical fibers 22 normally can be finished in a conventional manner. End treat material could also be utilized to coat the input end 24 of the fibers when it is desired to control the fiber spectral transmission characteristics.

The tube 18 together with the optical fibers extend from the adjacent end cap 14 and are configured in an L-shaped bend 32 which terminates at a ball or swivel joint 34. It should be understood that the L-shaped bend 32 and the ball or swivel joint 34 are merely illustrative examples of the fiber-optic transmission line 16 structure and that other similar arrangements could be utilized.

Figure 3:
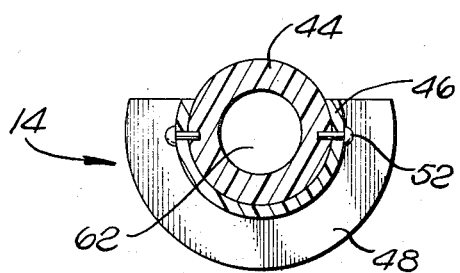
FIG. 3 is a cross-sectional view of the end cap of the probe in FIG. 1 taken along the line 3—3 thereof.

A slidable outer tube 42 normally made of Teflon (Trademark of DuPont Co.) or similar self-lubricating plastic material, surrounds the front end 26 of the housing tube 18. The slidable outer tube 42 and the conductive tube 18, which also can be made of Teflon, enables the outer tube 42 to telescopically move with respect to the tube 18. The end of the outer tube 42 adjacent the end cap 14 contains an outwardly extending flange 44 and is surrounded by a sleeve 46 of the end cap 14. The sleeve 46 is pivotably rotatable with respect to the flange 44 by means of a pair of rivets 52 shown in FIG. 3. The end cap 14 contains a partial cylindrical section 48 having a depth greater than its radius.

Figure 2:
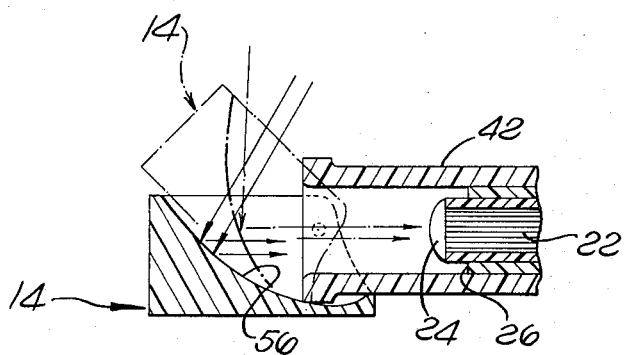
FIG. 2 is the end cap portion of the probe in FIG. 1 shown in cross-section, and illustrating the focusing mechanism for transmitting the source of light.

The interior surface of the partial cylindrical section 48 contains a parabolic reflecting surface 56 illustrated in FIG. 2. Light rays striking the reflective surface 56 are focused directly on the light-receiving input end 24 of the bundle of optical fibers. The interior surface of the section 48 adjacent the parabolic reflecting surface 56 is coated with a non-reflective black surface 58. The interior surface of the slidable outer tube 42 is also coated with a similar non-reflective black surface 62. Stray light striking these non-reflecting surfaces 58 and 62 are absorbed rather than being reflected into the optical fiber.

Light which is detected by the probe 12 of FIG. 1 is focused onto the light-receiving input end 24 of the fibers 22. The housing tube 18 can be bent at the L-shaped bend 32 or the swivel joint 34 for directing the probe 12 toward the source of light. The viewing angle of the input end 24 of the bundle of optical fibers can be varied between approximately 30° and 180° by telescopically sliding the outer tube 42 with respect to the housing tube 18. Rotation of the outer tube 42 about its axis and pivoting of the partial cylindrical section 48 about the rivets 52 enable further viewing directivity to be achieved.

Figure 4:
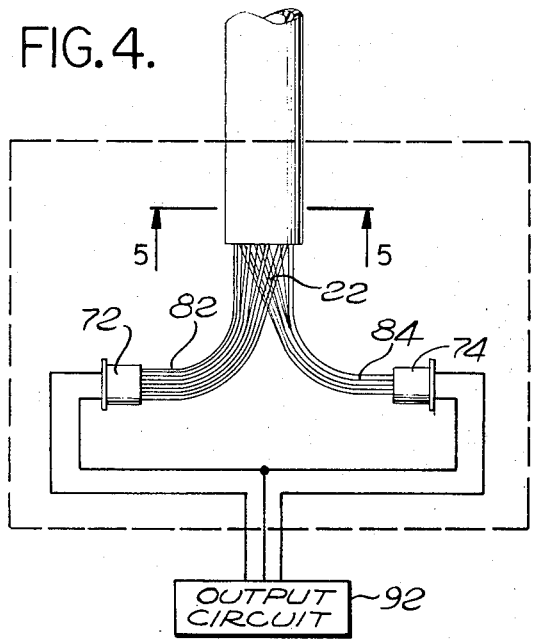
FIG. 4 is a view, partially schematically illustrated, of the receiving end of the probe of FIG. 1.
Figure 5:
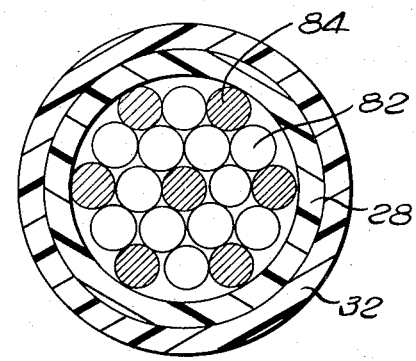
FIG. 5 is a cross-sectional view of the optical-transmission line used to transmit light taken along the line 4—4 of FIG. 4.

As illustrated in FIG. 4, the light rays are transmitted through the fiber optical transmission line 16 to a detector circuit formed of a first photoconductive cell 72 and a second photoconductive cell 74. The bundle of optical fibers 22 is split so that certain of the fibers 82 are coupled to the photocell 72 while other fibers 84 are coupled to the photocell 74. As can be seen in FIG. 5, the seven shaded fibers, shown equally distributed, represent the fibers 84 coupled to the photocell 74, whereas the non-shaded fibers, illustrated as fibers 82, are coupled to the photocell 72. The photocells 72 and 74 are sensitive to different wavelength bands of light. To achieve a signal strength at the photocells of equal intensity, the fibers' spacing as well as the number of fibers coupled to the photocells 72 and 74 are varied. In the instant example, the photocell 72 had a peak spectral sensitivity at the green-blue wavelength of 5200 Angstroms and photocell 74 had a peak spectral sensitivity at the yellow-orange wavelength of 6200 Angstroms. The two wavelength bands selected are color complements of each other and produce white light when combined.

In the example illustrated, photocell 72 is a type 707-H and photocell 74 is a type 702, both manufactured by the Clairex Corporation. The fiber selection ratio of seven fibers coupled to cell 74 and 12 fibers coupled to cell 72 matches the sensitivity for a reference illumination of about 10-foot candles at the probe input. Little or no correction is required between 1-foot candles to 500-foot candles although certain correction would be required below 1-foot candle. Output signals from the photocells 72 and 74 are compared at an output circuit 92. For the above fiber distribution and a light intensity of 10-foot candles, a balanced electrical output signal would be produced at the output circuit 92.

Figure 6:
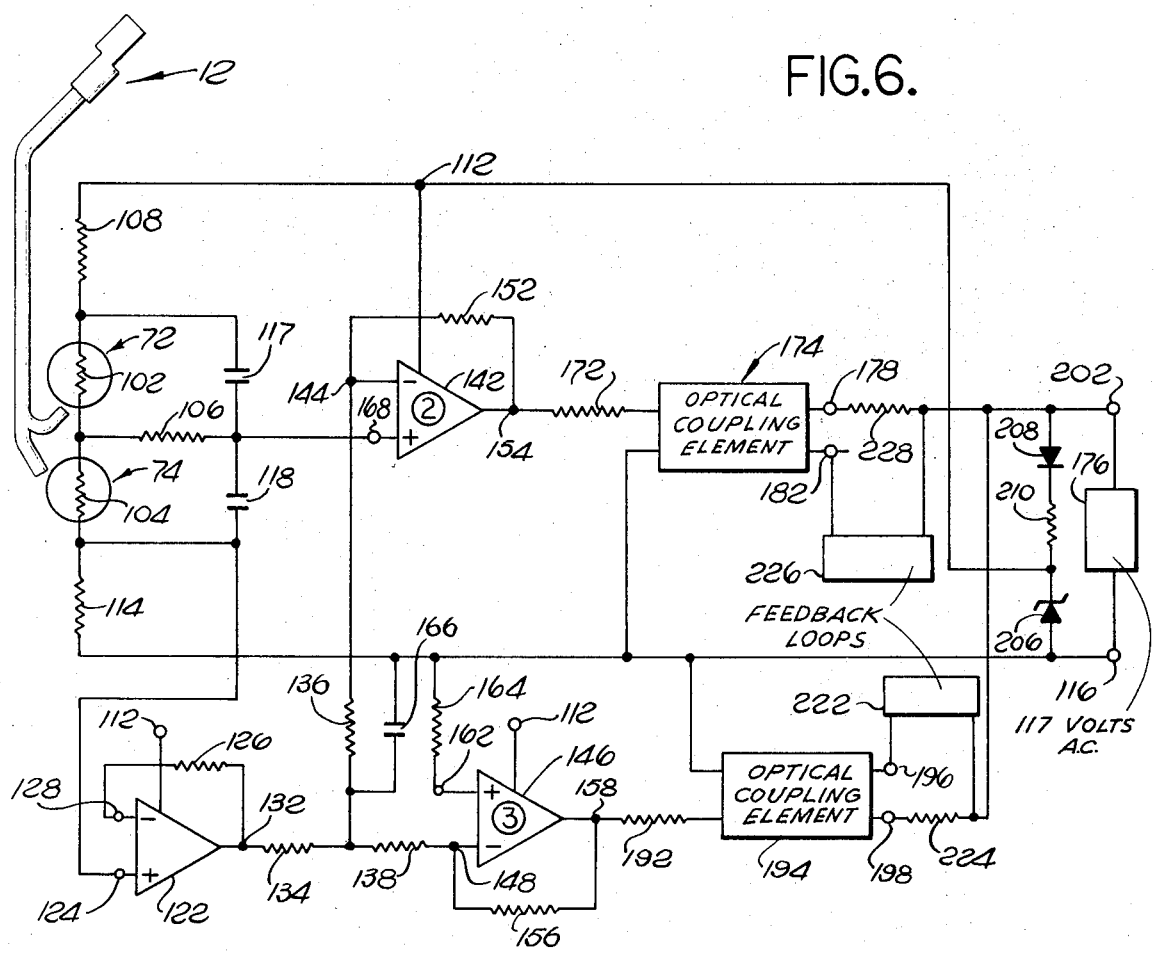
FIG. 6 is an electrical circuit utilized with the probe of FIG. 1 for measuring the spectral wavelength bands of the light source.

Referring now to FIG. 6, there is shown an electrical circuit diagram which can be used to control both the color hue and intensity of the light source, detected by the probe 12 of FIG. 1. The photocells 72 and 74 of FIG. 4 are depicted in the circuit diagram of FIG. 6 as a first and second input resistor, 102 and 104, respectively. The input resistors 102 and 104 are joined together at one end. The common end of the resistors 102 and 104 is connected to one side of a surge-current resistor 106. The other side of the resistor 102 is connected through a first fixed resistor 108 to a source of reference potential connected to a terminal 112. The other side of the resistor 104 is connected through a second fixed resistor 114 to a common or ground terminal 116.

The value of the first and second fixed resistors 108 and 114 is small compared to the value of the first and second input resistors 102 and 104. The configuration of the input resistors 102 and 104 and the fixed resistors 108 and 112 is such that an input signal balanced bridge network is provided.

To prevent wide fluctuation changes across the input resistors 102 and 104, one side of a first charging capacitor 117 is connected between the junction of the first input resistor 102 and first fixed resistor 108. The other side of the first charging capacitor 117 is connected to the other side of the surge-current limiting resistor 106. One side of a second charging capacitor 118 is connected between the junction of the second input resistor 104 and the second fixed resistor 114. The other side of the second charging capacitor 118 is connected to the junction of the first charging capacitor 117 and the surge-current resistor 106.

A first operational amplifier 122 has its non-inverting input terminal 124 connected to the junction of the second capacitor 118 and the second input resistor 104. A resistor 126 is connected between the inverting input terminal 128 of the operational amplifier 122 and the output terminal 132 of the operational amplifier. The first operational amplifier 122 is also connected to the source of reference potential at the terminal 112.

Output signals from the first operational amplifier 122 are coupled through a resistor 134 to one side of a first balancing resistor 136 and one side of a second balancing resistor 138. The other side of the first balancing resistor 136 is connected to a second operational amplifier 142 at its inverting input terminal 144. The other side of the second balancing resistor 138 is connected to a third operational amplifier 146 at its inverting terminal 148. A damping resistor 152 is connected between the second operational amplifier 142 inverting input terminal 144 and the output terminal 154. Similarly, a damping resistor 156 is connected between the inverting input terminal 148 and the output terminal 158 of the third operational amplifier 146. The second and third operational amplifiers 142 and 146 are coupled to the source of reference potential at terminal 112.

The non-inverting input terminal 162 of the third operational amplifier 146 is connected through a biasing resistor 164 to the common or reference terminal 116. A capacitor 166 provides damping for the output of the first operational amplifier 122 and is connected between the common terminal 116 and the junction of the balancing resistors 136 and 138.

Output signals from the junction of the first input resistor 102 and the second input resistor 104 are coupled through the surge resistor 106 to the non-inverting input terminal 168 of the second amplifier 142. The first and second input resistances 102 and 104 vary inversely with the amount of light flux coupled to the photosensitive elements 72 and 74, respectively, from the probe 12 of FIG. 1. The second operational amplifier 142 produces an output signal in accordance with the input signal at its non-inverting input terminal 168. A differential change in the value of the first and second input resistors 102 and 104 produces a change in the output signal of the second operational amplifier 142.

The input signal to the non-inverting input terminal 124 of the first operational amplifier 122 corresponds to changes in the sum of the first and second input resistors 102 and 104 and is proportional to the intensity of the light source. The output signal of the first operational amplifier at terminal 132 is coupled to the inverting input terminals 148 and 168 of the second and third operational amplifiers.

The output signal of the second operational amplifier at terminal 154 is, thus, a function of both the intensity of the light source as expressed by the sum of the resistors 102 and 104, as well as the differential change between the resistors 102 and 104. The output signal at the output terminal 158 of the third operational amplifier is a function of the intensity of the light source as expressed by the sum of the resistors 102 and 104.

Output signals from the second operational amplifier 142 are coupled through a resistor 172 to an optical coupling element 174. The optical coupling element 174 is conventional device which is used to isolate the input side of the circuit of FIG. 6 which is of generally low voltage with the output high voltage formed of 117 volt AC power supply 176. The output coupling element 174 also provides an output signal which varies inversely with the input signal. Typically, the optical coupling element contains a light source whose intensity varies in accordance with the input signal, and which in turn is used to inversely vary a light-sensitive resistor across which an output signal is provided at the terminals 178, 182 of the output coupling element 174.

Similarly, output signals at the terminal 158 of the third operational amplifier 146 are coupled through a coupling resistor 192 to an optical coupling element 194 which is similar to the optical coupling element 174 and whose output signals are provided across a pair of output terminals 196, 198.

The circuit of FIG. 6 can be used to control the intensity of the light source. A control loop circuit, typically a conventional first negative feedback loop circuit 222 is connected to the output terminal 196 and through a resistor 224 to the output terminal 198 of the optical coupling element. Variations in the intensity of the light source detected by the probe 12 can thus be compensated. As the intensity of the light source varies, the signal from the first feedback control loop circuit 222 can be used to vary the amount of power fed to the light source. Other variables could be used to vary the strength of the light source.

A second feedback control loop circuit 226 can be connected to the output terminal 182 and through a resistor 228 to the output terminal 178 of the optical coupling element 174. The first and second feedback control loop circuits 222 and 226 can each be used to control a separate source of light at wavelength bands corresponding to the sensitivity of the photocells 72 and 74, respectively. If the light sources both vary equally, only the intensity of the sources need be controlled. However, should the light sources vary such that a differential input signal is produced at the input terminal 168 of the second operational amplifier 142, the circuit compensates for these changes and enables the light source to again produce balanced desired light output signals.

The probe 12 can also be used to detect daylight and the system can provide turn-on, turn-off, and proportional intensity light control. Such a system is useful where it it necessary to conserve energy. Additionally, where the probe is placed very close to a light source, a low duty cycle, full power, periodic flash can be provided.

The power supply for the system is a regulated power supply of the square wave configuration output. The AC power supply 176 which may be a conventional 117 volt AC circuit, is coupled across a power supply terminal 202 and the common terminal 116. The zener diode 206 has its anode connected to the common terminal 116 and its cathode connected to the reference potential terminal 112. The AC power supply 176 is rectified by a diode 208 whose anode is connected to the power supply terminal 202. The cathode of the diode is connected through a resistor 210 to the cathode of the zener diode 206. The square wave voltage appearing across the zener diode 206 provides the sufficient power supply to operate the circuit on the alternate half cycles of the square wave output. Alternatively, a conventional DC power supply source can be used in the circuit of FIG. 6.

I claim:

1. A lighting control system for varying a light source comprising:

first means for detecting a plurality of spectrum wavelength bands of colors from said light source comprising a directivity-sensitive end cap, said end cap transmitting said detected light through a bundle of optical fibers to a plurality of photoconductive cells, each of said photoconductive cells being sensitive to light in one of said spectral wavelength bands, said end caps being movable with respect to said bundle of optical fibers;

second means for measuring the intensity of at least one of said bands; and third means for generating an output signal in accordance with the intensity of said measured band.

2. A lighting control system for varying a light source comprising:

first means for detecting a plurality of spectrum wavelength bands of colors from said light source and including a directivity-sensitive end cap, said end cap transmitting said detected light through a bundle of optical fibers to a plurality of photoconductive cells, each of said photoconductive cells being sensitive to light in one of said spectral wavelength bands said end cap containing a reflecting parabolic surface for focusing said light source onto said fiber optical bundle;

second means for measuring the intensity of at least one of said bands; and third means for generating an output signal in accordance with the intensity of said measured band.

3. A lighting control system in accordance with claim 1 wherein said end cap is axially movable with respect to the axis of said bundle of optical fibers.

4. A lighting control system in accordance with claim 1 wherein said end cap is rotatable with respect to the axis of said bundle of optical fibers.

5. A lighting control system in accordance with claim 1 wherein said end cap is pivotable at an angle with respect to the axis of said bundle of optical fibers.

6. A lighting control system in accordance with claim 1 wherein said bundle of fibers are movable for adjusting the position of said cap.

* * * * *